United States Patent [19]

Vetter et al.

[11] Patent Number: 5,779,753
[45] Date of Patent: Jul. 14, 1998

[54] METHOD OF AND APPARATUS FOR TREATING A SOLID WORKPIECE, ESPECIALLY A GLASS TUBE

[75] Inventors: Helmut Vetter, Ravensburg; Gisbert Staupendahl; Jens Bliedtner, both of Jena, all of Germany

[73] Assignee: Arzneimittel GmbH Apotheker Vetter & Co. Ravensburg, Ravensburg, Germany

[21] Appl. No.: 796,786

[22] Filed: Feb. 6, 1997

[30] Foreign Application Priority Data

Mar. 9, 1996 [DE] Germany ............ 196 09 199.3

[51] Int. Cl.$^6$ ............ C03B 23/04; C03B 33/06
[52] U.S. Cl. ............ 65/105; 65/108; 65/110; 65/112; 65/268; 65/269; 65/284; 65/DIG. 4; 65/DIG. 9; 65/166; 65/174
[58] Field of Search ............ 65/105, 112, 108, 65/110, 56, 268, 269, 284, 292, 286, DIG. 4, DIG. 9, 166, 174; 219/121.6, 121.76, 121.77, 121.67, 121.7, 121.71, 121.72, 121.83, 121.85

[56] References Cited

U.S. PATENT DOCUMENTS

| | | |
|---|---|---|
| 3,453,097 | 7/1969 | Hafner ............ 65/112 |
| 3,588,440 | 6/1971 | Morse ............ 65/DIG. 4 |
| 4,045,201 | 8/1977 | Caffarella et al. |
| 4,146,380 | 3/1979 | Caffarella et al. ............ 65/105 |
| 4,467,168 | 8/1984 | Morgan et al. ............ 65/105 |
| 4,606,747 | 8/1986 | Steinhoff ............ 219/121.77 |
| 4,682,003 | 7/1987 | Minakawa et al. |
| 4,731,254 | 3/1988 | Heineken et al. ............ 65/DIG. 4 |
| 5,254,883 | 10/1993 | Okiyama ............ 65/105 |
| 5,403,990 | 4/1995 | Fukuchi . |
| 5,512,078 | 4/1996 | Griffin ............ 65/269 |

FOREIGN PATENT DOCUMENTS

| | | |
|---|---|---|
| 35 46 001 | 10/1986 | Germany . |
| 42 24 282 | 1/1994 | Germany . |
| 44 11 037 | 10/1994 | Germany . |

*Primary Examiner*—Steven P. Griffin
*Attorney, Agent, or Firm*—Herbert Dubno; Yuri Kateshov

[57] ABSTRACT

A solid workpiece, e.g. a glass tube, is shaped by a focussed beam of visible light or light in an adjacent portion of the electromagnetic spectrum in a material removal, cutting or drilling operation and is heat-treated or remelted or shaped in a plastic state by heating that second beam which is less focussed or even divergent. The beams derive from a common source, a $CO_2$ laser, and pass through a splitting deflecting system so that the beams can be directed simultaneously either parallel to one another or with an inclination to one another at the same or different regions of the workpiece which is held in a holder capable of both rotating the workpiece and translating same.

12 Claims, 4 Drawing Sheets

METHOD OF AND APPARATUS FOR TREATING A SOLID WORKPIECE, ESPECIALLY A GLASS TUBE

FIELD OF THE INVENTION

Our present invention relates to a method of and an apparatus for the treatment of a solid workpiece, especially a glass workpiece which is preferably in tubular form for use in the pharmaceutical, chemical or veterinary medicine fields, the treatment involving heat treatment and/or material removal operations. The invention also relates to such a treatment utilizing electromagnetic radiation in the visible range of the electromagnetic spectrum or in spectral regions adjacent the visible range.

BACKGROUND OF THE INVENTION

Systems for subjecting a solid workpiece, e.g. a glass tube, to heating by the use of electromagnetic radiation are known, for example, from DE 35 46 001, DE 42 24 282 and DE 44 11 037.

The process as described in these German patent publications can be used for material removal from glass workpieces or for cutting operations, i.e. separating a workpiece into two or more parts.

After the material removal operation, reshaping, melting of the edges and the like require additional operating steps, usually other apparatus and, for the most part, transferring the workpiece to other working stations.

OBJECTS OF THE INVENTION

It is, therefore, the principal object of the present invention to provide a method of or a process for the treatment of a solid workpiece, especially a glass tube workpiece, which enables treatments involving different working parameters to be carried out one directly after another or even simultaneously so that the aforementioned drawbacks are avoided.

Another object of the invention is to provide a method of treating such workpieces which can reduce the capital cost of the process e.g. by simplifying the apparatus or allowing the apparatus which is used to be less expensive and simpler.

It is also an object of the invention to provide an improved apparatus for carrying out the method.

SUMMARY OF THE INVENTION

These objects and others which will become apparent hereinafter are attained, in accordance with the invention, in that the cutting or material removal operations, i.e. cutting, drilling or shaping by material removal, are effected by a sharply focussed beam of radiation having a high power density and the reshaping, melting or heat treatment are effected by a beam with a laser power density and which is less focussed by comparison to the first beam and can also be divergent. The two beams are positioned by a splitter and deflection unit from a common source of the radiation in the visible range of the spectrum or a portion of the spectrum adjoining the visible region so that they are trained upon the same or different locations on the workpiece and are oriented either parallel to one another or at an inclination to one another.

More particularly, the method of the invention can comprise the steps of:

(a) training on a solid workpiece a first, sharply focussed beam of electromagnetic radiation in the visible range of the spectrum or a part of the spectrum adjacent the visible range and with an energy density sufficient to effect material removal from the solid workpiece in a cutting, drilling or recessing operation;

(b) training on the solid workpiece a second, less focussed beam of the radiation with an energy density less than that required to effect material removal from the workpiece but sufficient to reshape, melt or heat-treat the workpiece;

(c) generating the electromagnetic radiation at a source; and (d) splitting the electromagnetic radiation from the source and controllably deflecting the split radiation to the beams so that the beams are selectively parallel to and inclined to one another and so that the beams are trained selectively on the same location and on different locations on the workpiece.

The advantages which are thus attained, in accordance with the invention, are that the two beams can have different characteristics or properties which are adjustable so that two different treatment operations can be carried out either simultaneously or directly following one another. For example, in the treatment of glass tubes, such as syringe bodies, with the first beam, the tube can be cut to length or shaped while the second beam can heat the region of the cut line to reduce stresses, can melt the cut region to smooth the cut or can heat a selected portion of the tubular workpiece to allow deformation thereof, e.g. by pressing, blowing or dye-forming, to impart the desired shape. For example, in a heat treatment operation, with the second beam, it is possible to after-heat the glass tube ahead of the cut region to effect a quasi-tempering thereof. The second beam may, moreover, be used in conjunction with the first beam to preheat a region to be cut or from which a portion of the material is to be removed. Because of the freely adjustable parameters of both beams, a wide variety of operations may be carried out with each at a wide variety of locations on the tubular glass workpiece at various locations which may coincide, overlap or be spaced from one another arbitrarily, thereby ensuring a practically universal utility for the method and the apparatus in the shaping of finished products for the pharmaceutical, chemical and veterinary medicine fields.

In a preferred embodiment of the invention, the interaction between the beam and the workpiece is registered at each working location and for controlling the operating parameters of the two beams as well as the holder and positioning device for the workpiece, the controller responds to the monitoring of the interaction at that location. The registration of the interaction can be effected by monitoring optical radiation emitted from the aforementioned location and the radiation which is thus sensed can be in the visible range or in the infrared (IR) range.

A direct optical evaluation can be effected through the use of a video camera. According to another feature of the invention, the clamping device or holder can seal the ends of the tubular workpiece and the second beam can heat a portion of that workpiece to a plastic state, whereupon the gas under pressure can be forced into the tubular workpiece to shape the heated portion by a blowing thereof. The configuration of the blown portion can be imported by a hollow body or mold applied to the workpiece.

In the cutting of glass tubes, the tubular workpiece can be supported rotatably in the clamping device and holder and, upon cutting of the workpiece into two tubular segments, the segments can be moved slightly apart and the second beam trained upon both cut edges of the two segments so that both edges are refired and smoothed by partial melting.

The apparatus of the invention can comprise a radiation generating unit for producing the two beams with their variable and adjustable characteristics and the means for sharply focussing one and providing it with the high power density while the other is less focussed or divergent and has the laser beam density.

The apparatus can comprise, more particularly:

a holder for positioning a solid workpiece;

means for training on the solid workpiece a first, sharply focussed beam of electromagnetic radiation in the visible range of the spectrum or a part of the spectrum adjacent the visible range and with an energy density sufficient to effect material removal from the solid workpiece in a cutting, drilling or recessing operation;

means for training on the solid workpiece a second, less focussed beam of the radiation with an energy density less than that required to effect material removal from the workpiece but sufficient to reshape, melt or heat-treat the workpiece;

a source of the electromagnetic radiation; and means for splitting the electromagnetic radiation from the source and controllably deflecting the split radiation to the beams so that the beams are selectively parallel to and inclined to one another and so that the beams are trained selectively on the same location and on different locations on the workpiece, the beams having variable radiation characteristics.

Advantageously the source is a laser and the means for splitting and controllably deflecting can include:

a first interference modulator for transforming a ray from the laser into a transmitted beam and a reflected beam;

a pair of reflectors intercepting the transmitted beam and reflecting the transmitted beam back through the first interference modulator as a further beam at an acute angle to the reflected beam;

a telescopic objective along the reflected beam;

a second interference modulator along a path of the reflected beam downstream from the telescopic objective for re-reflecting the beam passing through the telescopic objective to form the second beam;

a further reflector intercepting the further beam and reflecting the further beam through the second interference modulator as a transmitted beam forming the first beam; and means for tilting the second interference modulator to vary an angle of inclination between the first and second beams.

To allow variation of the focus, the telescopic objective can be adjustable to vary the imaging characteristics thereof. For example, the objective may be a varifocal objective.

Preferably, where the workpiece is composed of glass, the source of the radiation is a $CO_2$ laser.

The interference modulators can be Fabry-Perot interferometers.

The holder itself can be a clamping or chucking unit for the tubular glass workpiece which can rotate the workpiece and preferably can impart translatory movement thereto with freely selectable speeds.

When the beams are supplied generally parallel to the workpiece axis, in the path of the beam a swingable mirror or reflector can be provided for training the beams on the workpiece.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
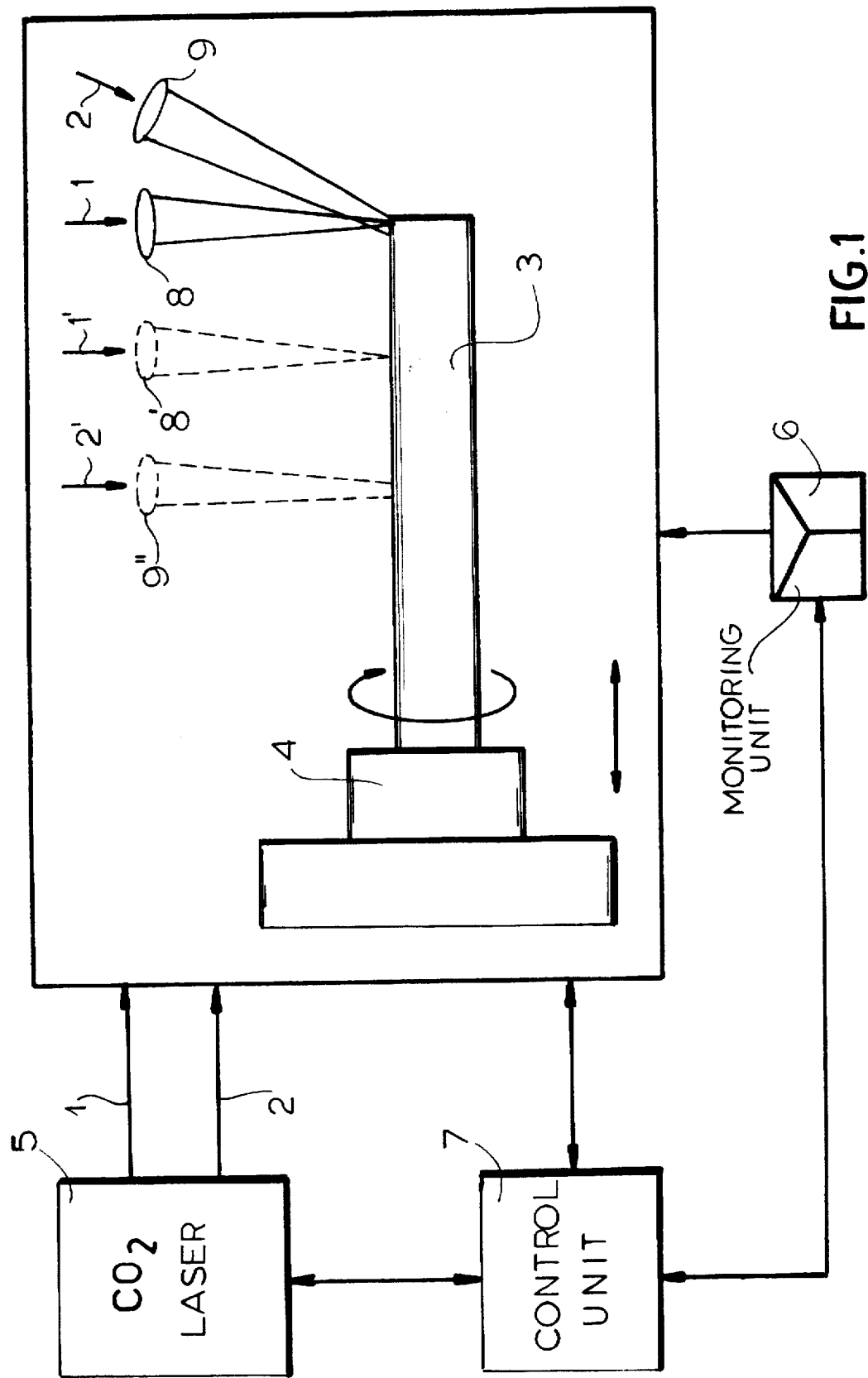
FIG. 1 is a diagrammatic side elevational view of an apparatus for carrying out the method of the invention, illustrating control elements in block diagram form.
Figure 2:
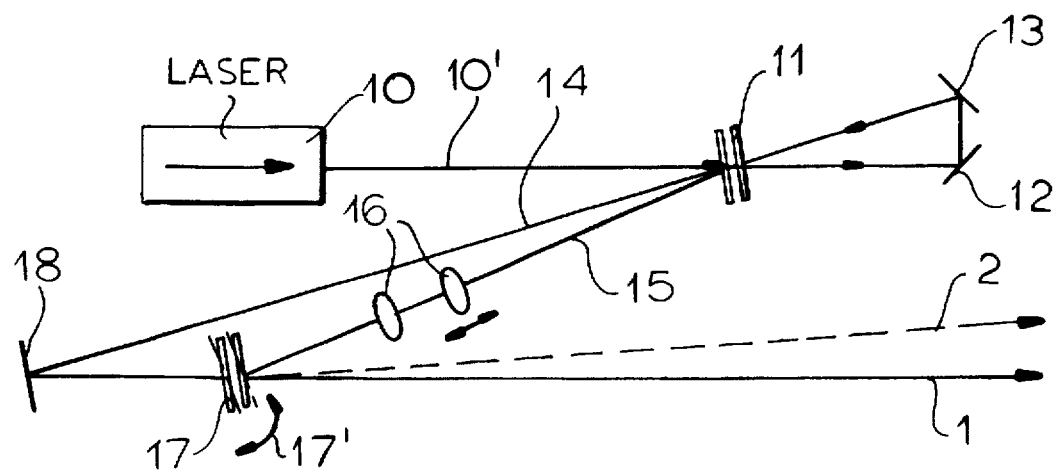
FIG. 2 is a diagram of beam paths according to the invention.
Figure 3:
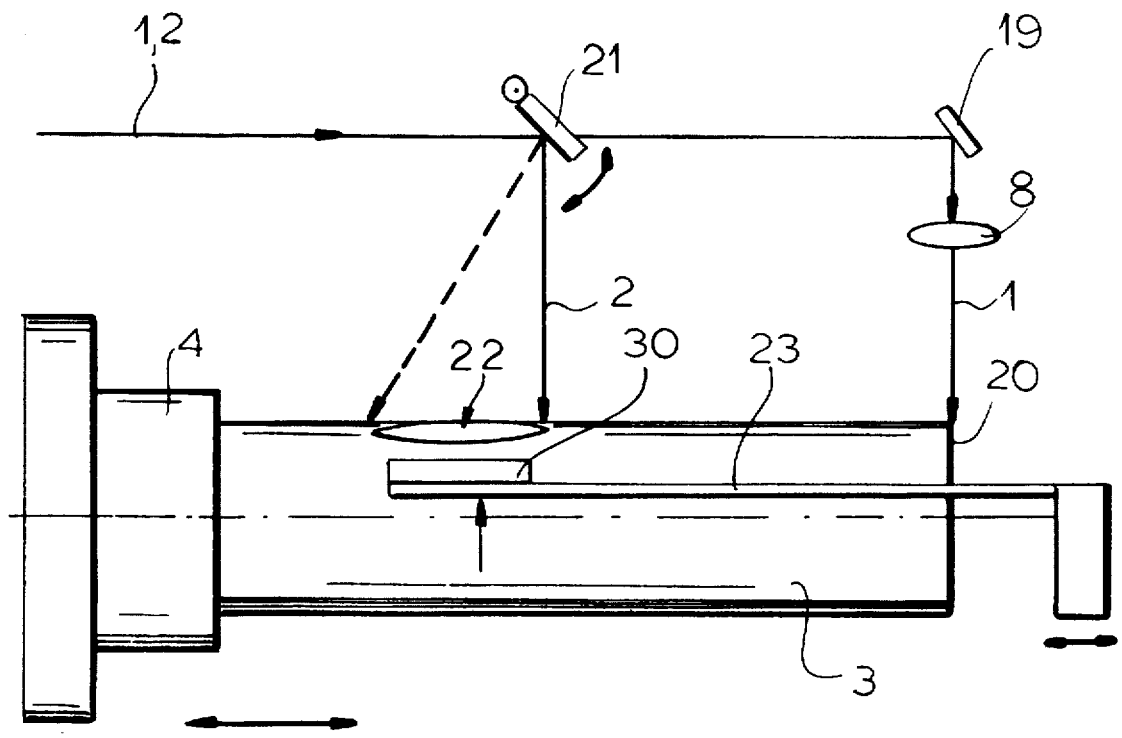
FIG. 3 is a diagrammatic side elevational view of another apparatus for carrying out the method.

In FIGS. 1–3, an apparatus has been illustrated for the treatment of workpieces of solid material, especially tubular workpieces 3 of glass, by cutting and heating operations. The resulting glass tubes are especially useful in pharmaceutical, chemical and veterinary medicine fields and a particular application of the process can be the preparation of syringe bodies.

The electromagnetic radiation which is used for cutting or heating of the glass tubes can be especially infrared radiation and the beams 1 and 2 to be described in greater detail hereinafter can be considered to be infrared light beams whose degree of absorption by the glass is relatively high and thus which are relatively efficient in the heating and cutting of the glass.

For the material removal aspect of the process, namely, cutting, boring or controlled removal of material otherwise from the tubular glass workpieces, a first sharply focussed beam 1 is used with a high power density while for reshaping, remelting or heat treatment of the tubular glass workpiece we use a second beam 2 with a lesser power density.

Figure 9:
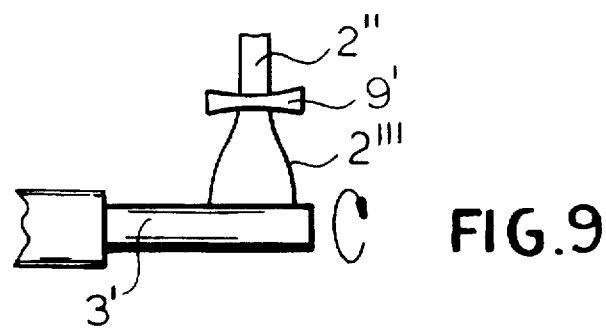
FIG. 9 illustrates in an elevation view in highly diagrammatic form the divergent beam treatment of a workpiece.

The second beam 2 can be focussed to a lesser extent or even defocussed so as to have a divergent character upon impingement on a tubular workpiece. For example, in FIG. 9, the beam 2" is shown to pass through a divergent lens 9' to form a divergent ray 2"' which impinges upon the tubular glass workpiece 3' whereas the first beam 1 passes through lens means 8' seen in FIG. 1. Otherwise the beam 2 or 2' can be considered to pass through a condensing lens system which can focus that beam to a greater or lesser extent.

The two beams 1, 2 are passed through deflecting units 11 and 12 which are so adjustable that the beams can be trained at the same location on the workpiece 3 as indicated at the right in FIG. 1, or at different locations as shown for the beams 1' and 2' in broken lines in FIG. 1. With the deflecting units it is possible to direct the beams so that they are parallel to one another (see the broken lines in FIG. 1) or are inclined to one another (see the solid lines showing the beams 1 and 2 in FIG. 1).

The beams 1 and 2 derive from a radiation generating unit which can be a $CO_2$ laser or some other source of high energy infrared radiation.

As has been schematically illustrated also in FIG. 1, a monitoring unit 6 is provided to monitor the interaction of the or each beam on the workpiece 3, the monitoring unit monitoring the interaction of the beams with the workpiece at each location at which a respective one of the beams of radiation impinges on the workpiece and providing an input to the control and regulating unit 7 which can be a computer for controlling at least one parameter selected from operating parameters of the beams, positions of the workpiece, and clamping of the workpiece in a workpiece holder in response to the monitoring of the interaction of the beams with the workpiece. The control unit in turn may allow the monitoring unit to be repositioned or to scan the workpiece. The interaction can be used to control the energy of the source 5, a focus of the respective beams or the selection of the portion of the spectrum which is used in the case in which the source 5 allows a selection of the frequency range. The monitoring of the interaction of the beams with the workpiece is effected by registering optical emissions radiated from the respective location and can be accomplished by photo-cell type measurements or by a video camera according to the present invention.

As can be seen from FIG. 2, within the source 5 a laser can be provided, the outgoing beam 10' of which impinges upon the first interference modulator which splits this beam into a transmitted beam and a reflected beam. The transmitted beam is, in turn, reflected by two reflecting surfaces or mirrors 12 and 13 which can form part of a single prism or a pair of prisms, the transmitted beam being then reflected along the path 14. The reflected beam from the interference modulator 11 is represented at 15, the beams 14 and 15 including an acute angle between them.

A second interference modulator 17 intercepts the beam 15 and reflects it anew downstream of a telescoping objective 16 shown to be formed by a pair of lenses which are adjustable with respect to one another to represent a varifocal system to vary an imaging characteristic of telescopic objective. Downstream of the interference modulator 17, the reflected beam 15 forms the second beam 2 previously described which is only partially focussed via the lens 9 or 9' or defocussed by the lens system 9" so as to impinge upon the workpiece 3 (FIG. 1) with a reduced power density.

The workpiece 3 can be held in a holder 4, i.e. an optical lathe chuck and preferably can be both rotated and moved axially back and forth for positioning of the workpiece. Alternatively, the lens system 8, 9 from which the beams 1 and 2 are directed on the workpiece can be provided with means for altering the angles of orientation of these beams to the workpiece and for shifting the beams translatorily along the workpiece axis.

As is also apparent from FIG. 2, the transmitted beam 14, reflected at a mirror 18 can be passed through the interference modulator 17 so as to constitute a double-transmitted beam informing the beam 1.

The second interference modulator 17 is angularly adjustable as represented by the arrow 17' to vary the angles between the beams 1 and 2. The two interference modulators 11 and 17 can be Fabry-Perot interferometers.

As can be seen from FIG. 3, the holder positioning unit 4 for the workpiece 3, which can rotate the latter and effect a translation thereof, can be operated at freely selectable speeds. As shown in solid lines, the beams 1 and 2 can be directed onto the workpiece from parallel paths via mirrors 19 and 21, the former being shown to be fixed while the latter is swingable so that the beam 2 can sweep over a surface region 22 of the workpiece. The beam 1 is here directed at an end face of the workpiece 3 illustrating that it has been used to cut off a piece of the workpiece to form that end face.

Figure 8:
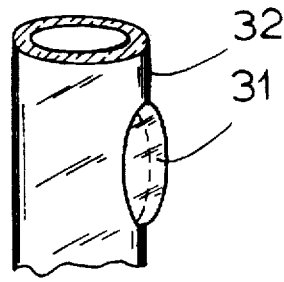
FIG. 8 is a perspective view showing a portion of a syringe body provided with a formation like that made with the apparatus of FIG. 4.

The region 22 which is heated by the beam 2 may be heated to plasticity so that it can be deformed outwardly by a finger 23 which is inserted into the end of the tubular workpiece and has a shaping tool 30 which can be pressed from the inside downwardly against the heated region 22 to form, for example, a bulge 31 on the syringe body 32 as shown in FIG. 8. This bulge may constitute a bypass for liquid within the syringe.

Figure 4:
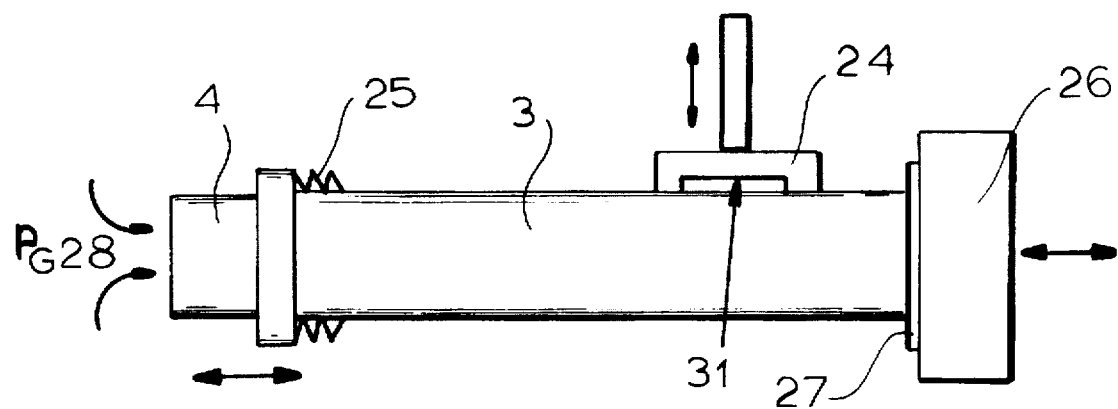
FIG. 4 is a diagrammatic side elevational view of an apparatus for providing formations of a glass tube.

In FIG. 4, the tubular workpiece 3 is shown to be sealed at both ends via sealing elements 25, 26 and 27 and, after being heated over a surface region, a die 24 can be pressed against the region of the workpiece heated to plasticity by the beam 2 and gas can be admitted under pressure as represented at PG28 to blow the bypass 31 on the glass tube against the die 24.

Figure 7:
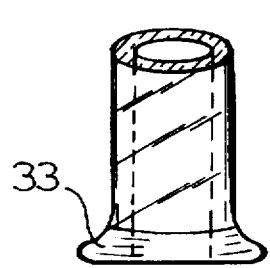
FIG. 7 is a perspective view showing the shaping of a cut edge of a glass tube workpiece.

When the end 20 of the tube is heated to render it plastic, a shaping member can be pressed against it as indicated by numeral 27 in FIG. 4 to form a flange 33 as shown in FIG. 7.

Figure 5:
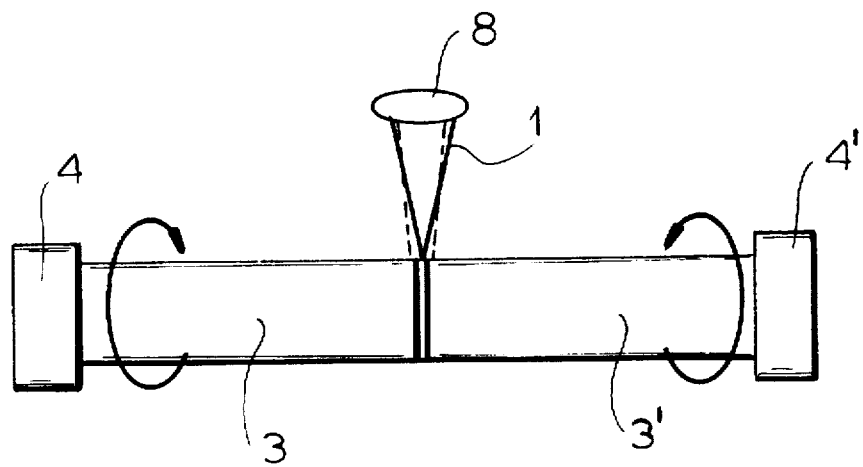
FIGS. 5 and 6 are side elevational views illustrating two steps in a method involving the subdivision of a tubular workpiece to form two tubular products.
Figure 6:
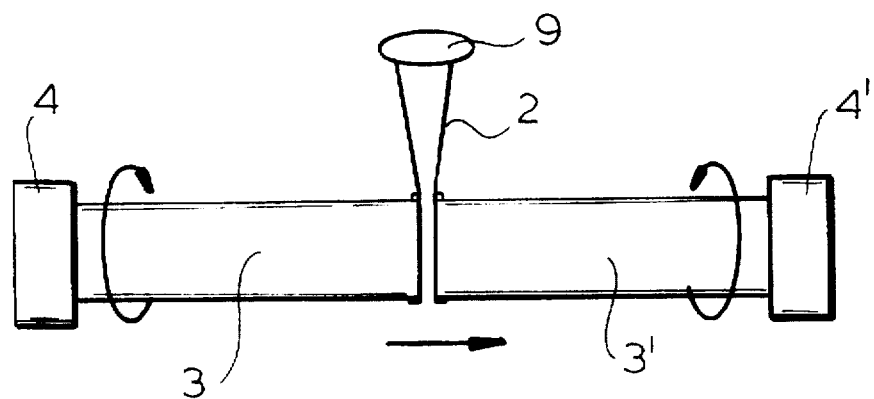

As can be seen from FIG. 5, the ends of a workpiece may be engaged in two holders 4 and 4' so that they can be cut by the focussed beam traversing the lens system as represented in FIG. 5, thereby forming two syringe bodies 3, 3'. The beam 2 can then be applied, after the syringe body 3' has been reflected slightly (FIG. 6) so that the beam 2 can then remelt the end portions of both syringe bodies. The remelted ends can then be shaped to form the flange 33, a bead, or the like.

If the two syringe bodies are rotated rapidly and the heating is sufficient, centrifugal force can form the flange 33 or a bead.

We claim:

1. A method of shaping a tubular glass workpiece, comprising the steps of:

(a) training on a tubular glass workpiece a first, sharply focussed beam of electromagnetic radiation in the visible range of the spectrum or a part of the spectrum adjacent the visible range and with an energy density sufficient to effect material removal from said workpiece in a cutting, drilling or recessing operation;

(b) training on said workpiece a second focussed beam of said radiation with an energy density less than that required to effect material removal from said workpiece but sufficient to reshape, melt or heat-treat said workpiece;

(c) generating said electromagnetic radiation at a source;

(d) splitting said electromagnetic radiation from said source to form said first and second beams and controllably deflecting said first and second beams so that said first and second beams are selectively parallel to or inclined to one another and so that said beams are trained selectively on the same location or on different locations on said workpiece; and (e) monitoring the interaction of said first and second beams with said workpiece at each location at which a respective one of said first and second beams impinges on said workpiece, and controlling at least one parameter selected from operating parameters of said first and second beams, positions of said workpiece, and clamping of said workpiece in a workpiece holder in response to the monitoring of the interaction of said first and second beams with said workpiece.

2. The method defined in claim 1 wherein the monitoring of the interaction of said first and second beams with said workpiece is effected by registering optical emissions radiated from said each location at which the respective one of said first and second beams impinges on said workpiece.

3. The method defined in claim 1 wherein said second beam is a divergent beam.

4. The method defined in claim 1 wherein said step (b) further comprises the steps of:

(b') sealing opposite ends of said workpiece, (b") thereafter heating a portion of said workpiece to plasticity with said second beam, and (b'") while said portion is plastic, introducing a gas under pressure into said workpiece to deform said portion of the workpiece outwardly.

5. A method of shaping a tubular glass workpiece, comprising the steps of:

(a) training on a tubular glass workpiece a first, sharply focussed beam of electromagnetic radiation in the visible range of the spectrum or a part of the spectrum adjacent the visible range and with an energy density sufficient to effect in cutting the glass workpiece into at least two pieces;

(b) training on said workpiece a second focussed beam of said radiation with an energy density less than that required to effect material removal from said workpiece but sufficient to reshape, melt or heat-treat said workpiece;

(c) generating said electromagnetic radiation at a source;

(d) splitting said electromagnetic radiation from said source to form said first and second beams and controllably deflecting said first and second beams so that said first and second beams are selectively parallel to or inclined to one another and so that said beams are trained selectively on the same location or on different locations on said workpiece; and (e) drawing cut ends of said two pieces apart by a slight distance, and treating said cut ends simultaneously with said second beam in step (b) to at least smooth said cut ends.

6. An apparatus for shaping a tubular glass workpiece, comprising:

a holder for positioning a tubular glass workpiece;

means for training on said workpiece a first, sharply focussed beam of electromagnetic radiation in the visible range of the spectrum or a part of the spectrum adjacent the visible range and with an energy density sufficient to effect material removal from said workpiece in a cutting, drilling or recessing operation;

means for training on said workpiece a second focussed beam of said radiation with an energy density less than that required to effect material removal from said workpiece but sufficient to reshape, melt or heat-treat said workpiece;

a laser for generating said electromagnetic radiation; and means for splitting said electromagnetic radiation from said laser to form said first and second beams and controllably deflecting said first and second beams so that said first and second beams are selectively parallel to or inclined to one another and so that said first and second beams are trained selectively on the same location or on different locations on said workpiece, said means for splitting comprising:

a first interference modulator for transforming a ray from said laser into a transmitted beam and a reflected beam;

a pair of reflectors intercepting said transmitted beam and reflecting said transmitted beam back through said first interference modulator as a further beam at an acute angle to said reflected beam;

a telescopic objective along said reflected beam;

a second interference modulator along a path of said reflected beam downstream from said telescopic objective for re-reflecting the reflected beam passing through said telescopic objective to form said second beam;

a further reflector intercepting said further beam and reflecting said further beam through said second interference modulator as a transmitted beam forming said first beam; and means for tilting said second interference modulator to vary an angle of inclination between said first and second beams.

7. The apparatus defined in claim 6 wherein said telescopic objective is adjustable to vary an imaging characteristic thereof.

8. The apparatus defined in claim 6 wherein said laser is a $CO_2$ laser.

9. The apparatus defined in claim 6 wherein said interference modulators are Fabry-Perot interferometers.

10. The apparatus defined in claim 6 wherein said holder is provided with means for rotating said workpiece and translatorily displacing same with variable speeds.

11. The apparatus defined in claim 10 wherein said means for splitting and controllably deflecting includes a swingable splitting mirror along a path of radiation from said laser.

12. The apparatus defined in claim 6 wherein said second beam is a divergent beam.

* * * * *